United States Patent
Van Beers et al.

(10) Patent No.: US 9,109,146 B2
(45) Date of Patent: Aug. 18, 2015

(54) ADHESIVE COMPOSITION WITH IMPROVED GREEN STRENGTH

(75) Inventors: Petrus Wilhelmus Johannes Van Beers, RM Hilvarenbeek (NL); Petrus Johannes Cornelius Vosters, CK Haaren (NL)

(73) Assignee: BOSTIK S.A., Courbevoie (FR)

( * ) Notice: Subject to any disclaimer, the term of this patent is extended or adjusted under 35 U.S.C. 154(b) by 944 days.

(21) Appl. No.: 13/257,011

(22) PCT Filed: Mar. 17, 2010

(86) PCT No.: PCT/EP2010/001673
§ 371 (c)(1), (2), (4) Date: Oct. 24, 2011

(87) PCT Pub. No.: WO2010/105814
PCT Pub. Date: Sep. 23, 2010

(65) Prior Publication Data
US 2012/0042499 A1    Feb. 23, 2012

(30) Foreign Application Priority Data
Mar. 19, 2009    (EP) .................................. 09003950

(51) Int. Cl.
| *C08L 83/00* | (2006.01) |
| *C09J 167/00* | (2006.01) |
| *C09J 123/10* | (2006.01) |
| *C09J 171/02* | (2006.01) |
| C08K 5/5415 | (2006.01) |
| C08L 23/10 | (2006.01) |
| C08L 71/02 | (2006.01) |
| C08L 77/00 | (2006.01) |
| C08L 91/06 | (2006.01) |

(52) U.S. Cl.
CPC .............. *C09J 167/00* (2013.01); *C09J 123/10* (2013.01); *C09J 171/02* (2013.01); *C08G 2170/20* (2013.01); *C08K 5/5415* (2013.01); *C08L 23/10* (2013.01); *C08L 71/02* (2013.01); *C08L 77/00* (2013.01); *C08L 91/06* (2013.01); *C08L 2312/08* (2013.01); *Y10T 29/49885* (2015.01)

(58) Field of Classification Search
CPC ......... C08L 23/10; C08L 71/00; C08L 71/02; C08L 2312/08
USPC .......................... 524/506, 265, 266, 267, 268
See application file for complete search history.

(56) References Cited

U.S. PATENT DOCUMENTS

| 2002/0103321 A1 | 8/2002 | Jyono et al. | |
| 2007/0088110 A1* | 4/2007 | Kohl et al. | 524/261 |
| 2009/0098388 A1* | 4/2009 | Harvey et al. | 428/429 |

FOREIGN PATENT DOCUMENTS

| EP | 1 041 101 A2 | 10/2000 |
| EP | 1 605 008 A2 | 12/2005 |
| EP | 1 373 363 B1 | 8/2007 |
| WO | WO 98/18843 A1 | 5/1998 |

OTHER PUBLICATIONS

International Search Report of PCT/EP2010/001673 (Jun. 24, 2010).

* cited by examiner

*Primary Examiner* — Ling Choi
*Assistant Examiner* — Wenwen Cai
(74) *Attorney, Agent, or Firm* — Millen, White, Zelano & Branigan, P.C.

(57) ABSTRACT

Adhesive composition comprising :
 at most 15% of a PolyPropylene (or PP) having a melting point between 30° C. and 100° C. ;
 from 30 to 60% of a cross-linkable polymer with silyl end groups comprising cross-linking groups bonded to the silicon atom, said cross-linkable polymer having a functionality of on average 3-12 cross-linking groups;
 a cross-linking catalyst for the polymer;
 a water scavenger; and
 a rheology controller.
The composition is used for direct glazing of a windscreen on a metallic automotive frame.

12 Claims, No Drawings

ADHESIVE COMPOSITION WITH IMPROVED GREEN STRENGTH

The application relates to an adhesive (or sealant) composition comprising:
- a cross-linkable polymer;
- a cross-linking catalyst for the polymer;
- a rheology controller; and
- a water scavenger;

wherein the cross-linkable polymer has silyl end groups having cross-linking groups, the cross-linkable polymer having a functionality of on average 3-12 cross-linking groups.

Such a composition is known from the patent application EP 1605008 A of Bostik, the contents of which are hereby enclosed with reference thereto.

This composition is based on a Silyl Modified Polymer (SMP), which is cross-linkable under moisture. Thereto the polymer has silicon (Si) groups which have cross-linking groups capable of forming hydroxyl groups upon hydrolyzation in the presence of moisture. Subsequently, the hydroxyl groups react with each other under the influence of a catalyst, to form siloxane cross-linkages (i.e. —Si—O—Si—) via a condensation reaction. The silicon groups are so-called silyl end groups as they are provided as an end part onto the polymer chain—for this reason the polymer is also referred to as 'silyl end capped'. The silyl end groups are for instance present on both ends of the polymer main chain. More silyl end groups can be included as side branches of the main chain. Note that each silyl end group itself has a number of hydroxyl or hydrolysable groups, which accounts for the number of reacting groups. The functionality of the cross-linkable polymer can in this context be defined as the number of silyl end groups multiplied by the number of functional groups (i.e. cross-linking groups) that each silyl end group possesses, or in other words: the total number of functional groups per molecule of the cross-linkable polymer.

The cross-linkable polymer has preferably on average 2-4 silyl end groups (allowing for deviations in the practice of preparing the polymer, which inherently contains some anomalies). Also the cross-linkable polymer may be constituted from a mixture of cross-linkable polymers, which have different numbers of silyl end groups, thus leading to an average number of silyl end groups. Each silyl end group has preferably on average 2 or 3 reacting groups, capable of forming siloxane linkages. These numbers lead to one silyl end group being cross-linked to either 2 or 3 other polymers via their own silyl end groups. For thermodynamical reasons, also the number of reacting groups per silyl end group is given on average, because of the deviations occurring when producing such polymers. The preferred range for functionality of the cross-linkable polymer is on average 3-12 cross-linking groups, more preferred is a range on average of 4-10, most preferred is a range of 5-8.

After the cross-linkage reactions are completed, the polymer is fully cured and it exhibits an excellent behaviour regarding stress-strain properties and shear strength. The composition is particularly suitable for use as a motor vehicle windscreen adhesive or sealant.

The composition as such can be applied at room temperature and gives an effective skin formation due to reaction with ambient moisture in 10-20 minutes at 20° C. This is especially advantageous in the application for motor vehicle windows, in particular in the case when a damaged windshield has to be replaced, because one may drive away shortly after the new windshield has been glued.

However, when the known compositions are used to adhere objects to substrates, problems arise under various circumstances because the composition has initially a relatively low resistance to shear and tear forces. During the first stages of the gluing process, an object coated with glue which is contacted and adhered to a wall may shift downwards—or sag—from its initial placing, as a result of gravity which has the effect of a downward, shearing force. In another case, when an object is glued upon a substrate having a bent shape and the glued object has to conform to the bent shape, clamps are needed to force the object according to the bent shape of the substrate, because the adhesive is not capable to keep the object in the same bent shape. In other words, the adhesive composition is directly after application not 'tacky' enough to withstand shear or tear forces that may be present in daily practice. The initial or instantaneous adhesive action of the fresh, uncured adhesive composition between an object and a substrate, is also referred to as 'green strength'. Green strength thus expresses the 'glue force' of the composition, directly after the moment the object and substrate are glued onto each other, it can also be described as 'initial grab'.

It is noted that the 'green strength' is a property of the adhesive composition defined for the moment directly after gluing has taken place, and should not be confused with shear strength or stress-strain properties which are 'definitive' properties of the adhesive composition after curing has been completed, i.e. not directly after application. Preferably, the "green strength" expresses the "glue force" of the composition, after being coated on at least one of the object and the substrate to be assembled, immediately when said object and substrate are contacted and thereafter during a period of time comprised between 1 second and 15 minutes.

It is the object of the invention to devise a composition which has an improved green strength in order to overcome the above problems. Also, the composition, when cured, should have stress-strain properties and a shear strength that are comparable to the above identified composition from the prior art, or at least acceptable in view of its use as adhesive or sealant. Furthermore, the composition has to fulfil the requirement of 'gunnability', i.e. sufficient flowing properties at the moment of dispensing the composition, e.g. from an application pistol or other pressurized container. A satisfactory gunnability is largely dependent on the viscosity of the composition at the moment it is dispensed. In contrast thereto, once the composition is applied, it should exhibit good sag and slump control, i.e. it should not flow further or diffuse from the initial place of application.

It has now been found that this object can be achieved in whole or in part by the composition of the present invention.

The adhesive (or sealant) composition according to the invention, comprises:
- a content of at most 15% of a PolyPropylene (also designated in the present text by PP) having a melting point between 30° C. and 100° C.;
- from 30 to 60% of a cross-linkable polymer with silyl end groups comprising cross-linking groups bonded to the silicon atom, said cross-linkable polymer having a functionality of on average 3-12 cross-linking groups;
- a cross-linking catalyst for the polymer;
- a water scavenger; and
- a rheology controller.

All percentages given in the present text in relation with the content of any ingredient in the composition shall correspond to a percentage weight/weight unless pointed out otherwise.

The melting point of the PP is in this context the temperature at which the transition to a solid amorphous phase starts. In contrast to the known adhesive composition that is applied at ambient temperature, the composition of the invention is designed to be applied while being warm. This means that the composition is heated before application to a temperature between 30° C. and 100° C., preferably between 50° C. and 90° C., most preferably between 70° C. and 85° C., a temperature of approximately 80° C. being most preferred. From the instant of application, the composition is allowed to cool off. The polypropylene has advantageously a melting point between 50° C. and 90° C.

Because of its warm application, the composition of the invention may be typified as a 'warm melt' composition, as opposed to so-called hot melt compositions which typically require temperatures above 100° C.

The results obtained by warm application of the composition show that on the one hand the green strength is significantly improved, while on the other hand the stress-strain properties and shear strength (such as shear stress at rupture) are acceptable in comparison with the known composition of EP 1605008. Additionally, the gunnability of the composition is suitable for warm application, while sag and slump control is excellent.

These results of the invented composition are surprising because a priori the addition of such a thermoplastic polymer as PP is expected to seriously compromise the stress-strain properties and shear strength of the cured composition. It would furthermore affect the gunnability of the composition to an unknown extent.

Advantageously, the content of PP is from 2 to 10%, preferably from 4 to 8%. Suitable PP is Licocene® PP1302 from Clariant, which has a melting point of 90° C.

Preferably the functionality of the cross-linkable polymer is on average of 4-10 cross-linking groups, more preferably 5-8.

The silyl end group of the cross-linkable polymer may be sterically hindered. For example, the end group may include beta-hindered alkoxy-silyl groups. The steric hindrance of the silyl end group may further enhance the stress-strain properties and shear strength of the composition after the complete curing thereof.

Preferably, the silyl end group of the cross-linkable polymer comprises the following formula:

$$—Si(R^2)_{3-a}X_a$$

wherein:
R$^2$ represents an alkyl group containing 1 to 20 carbon atoms, an aryl group containing 6 to 20 carbon atoms, an aralkyl group containing 7 to 20 carbon atoms or a triorganosiloxy group of the formula (R')$_3$SiO—, in which the three R' groups are the same or different and each is a monovalent hydrocarbon group containing 1 to 20 carbon atoms, and when there are two or more R$^2$ groups, they may be the same or different;
X represents a hydroxyl group or a hydrolysable group and, when there are two or more X groups, they may be the same or different;
a represents 0, 1, 2 or 3.

As explained in the introductory part, the number a that refers to the X groups, is in fact the number of cross-linking groups per silyl end group. As such, each X group may link to an X group of another molecule of a cross-linkable polymer of the invention. Not all silyl end groups need to have an X group, as long as the molecule in total has 3 or more X groups. In this way, the molecule will be linking at least in three directions, thus achieving a cross-linking chain for a cross-linking network of cross-linked polymers. The total number of X groups of the molecule is obviously also dependent of the number of silyl end groups present in the molecule. In general, the total number of X groups of the molecule need not be higher than 12, as this by far achieves sufficient cross-linking capacity of the molecule.

As a further preference for the composition according to the invention, the silyl end group of the cross-linkable polymer has the following formula:

$$—[Si(R^1{}_{2-b})(X_b)O]_m Si(R^2)_{3-a}X_a$$

wherein:
R$^1$ and R$^2$ are the same or different and each represents an alkyl group containing 1 to 20 carbon atoms, an aryl group containing 6 to 20 carbon atoms, an aralkyl group containing 7 to 20 carbon atoms or a triorganosiloxy group of the formula (R')$_3$SiO—, in which the three R' groups are the same or different and each is a monovalent hydrocarbon group containing 1 to 20 carbon atoms, and when there are two or more R$^1$ or R$^2$ groups, they may be the same or different;
X represents a hydroxyl group or a hydrolysable group and, when there are two or more X groups, they may be the same or different;
a represents 0, 1, 2 or 3,
b represents 0, 1,or 2 and the value of b in two or more recurring units may be the same or different;
m represents an integer of 0 to 19;
with the condition that the relation a+Σb≥1 is satisfied.

According to the above formula, the silyl end group will, if m does not equal 0, contain a siloxane chain (depicted between straight brackets), to which chain hydrolysable groups X$_b$ may be bonded, in addition to hydrolysable groups X$_a$. If m equals 0, then the siloxane chain is absent and only hydrolysable groups X$_a$ will be present at the silicon forming the end cap.

With further preference, in the composition of the invention, the silyl-end group of the cross-linkable polymer has the following formula:

$$-A-(CH_2)_n—CHR^3—CH_2-[Si(R^1{}_{2-b})(X_b)O]_m Si(R^2)_{3-a}X_a$$

where:
n is zero or 1;
R$^3$ is a saturated or unsaturated lower alkyl group, said lower alkyl group being optionally substituted with an hydroxyl or thiol group; or an hydroxyl group or a thiol group; or a lower alkoxy group; or a lower thioalkoxy group;
A is an oxo, thio, carbamate or ureido linkage.

According to the above formula, the silicon containing part is extended with a hydrocarbon chain optionally having additional cross-linking groups forming non-siloxane linkages. This feature further enhances the strength of the composition after the complete curing thereof. "Lower alkyl group" is intended to mean a linear or branched alkyl group having 1 to 4 carbon atoms, inclusive. In one preferred embodiment, R$^3$ is methyl or ethyl; and n=1.

Referring to the above general formulas, R$^1$ and R$^2$ each may be an alkyl group such as methyl and ethyl; a cycloalkyl group such as cyclohexyl; an aryl group such as phenyl; an aralkyl group such as benzyl; or a triorganosiloxy group represented by the formula (R')$_3$SiO— wherein R' is methyl or phenyl, for instance. Particularly preferred for R$^1$ and R$^2$ are methyl.

The hydrolyzable group mentioned above for X is not particularly restricted but can be a known hydrolyzable group. Thus, for example, hydrogen, halogen, alkoxy, acyloxy, ketoximate, amino, amido, acid amido, aminoxy, mercapto and alkenyloxy can be mentioned. In view of mild hydrolyzability and ease of handling, alkoxy groups such as methoxy, ethoxy, propoxy and isopropoxy are preferred.

Preferably, in the composition of the invention, the cross-linkable polymer comprises a polymer rest which is a polyether polymer, a polyether-urethane polymer, a polyester polymer or a polyester-polyurethane polymer or mixtures thereof. More preferably, the polymer bearing the moisture cross-linkable groups contains a polymer rest that is a polyether, a polyester or mixtures of these. An example of a suitable polyether is a polyoxypropylene polymer, for example having a silyl group at each end of the chain.

In one preferred embodiment, the cross-linkable polymer is of the formula:

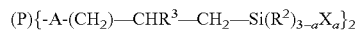

where P represents the polymer rest.

Especially, the cross-linkable polymer can have the following formula:

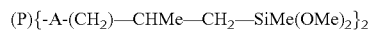

More preferably, said cross-linkable polymer is of the formula:

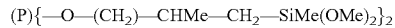

where P is the rest of a polyetherpolyol or a polyester-polyol.

When cross-linked such polymers give rubbery elastomers with a degree of cross-link density depending on the number of hydrolysable groups in the prepolymer molecule and on the kind and amount of the cross-linking catalyst and other water-reactive agents. These polymers are available from Kaneka, under reference SAX® 720 and 725, for example.

Most preferably, the cross-linkable polymer of the invention corresponds to the compound SAX® 725 or SAX® 720, available from Kaneka (Japan). Such a polymer includes on average 2 silyl end groups, each having on average 3 functional groups attached to it (for thermodynamical reasons the polymers cannot have exactly 2 silyl end groups and exactly 2 or 3 functional groups, i.e. a 100% substitution of all three available positions of the silyl end group). The polymers have an average molecular weight (Mw) of about 25000 and 20000, respectively.

For the manufacture and other details regarding the polymers, reference is made to EP-A-0819749, EP-A-1038901 and EP-A-1153982, incorporated herein by reference. In particular, reference is made to EP-A-1605008—already mentioned as prior art above—especially with regard to paragraphs [28]-[40] in which some preparation processes are given in detail.

The catalyst used in the composition of the present invention may be any catalyst which has activity in relation to the cross-linking of the hydrolysable groups, such as the silyl groups of prepolymers usable in the present invention. Organotin catalysts, for example, preferably, dioctylbis(2,4-pentanedionato-O,O')tin, dibutylbis(2,4-pentanedionato-O,O') tin, dibutyltindiacetylacetonate (DBTDAA), or dibutyltindilaurate (DBTDL), dibutyltindiacetate, dibutyltin-dibutylate, tinoctoate or combinations of tin octoate and laurylamine (co-catalyst system), are suitable for this use.

Preferably, in the composition of the invention, the catalyst is a tin catalyst.

A suitable quantity of catalyst may be 0.2% to 0.9% with respect to the weight of the polymer, when the cross-linkable polymer has a low number of silyl end groups, for instance 2 to 4. When higher number of silyl end groups per polymer are present, the quantity of catalyst may be lower, e.g. 0.05%.

It is preferred for the compositions of the invention that the moisture content be controlled to prevent immediate cross-linking of the prepolymer resulting in increasing viscosity or even solidification of the composition during storage. Moisture may be imported into the composition in fillers or pigments which may be present. For this reason the composition of the present invention contains one or more water scavengers. Suitable water scavengers are the alkoxysilanes, such as trialkoxysilanes (esp. trimethoxysilanes), and/or amino-, mercapto- or epoxy-containing alkoxysilanes. Examples are gammaglycidoxypropyltrimethoxysilane, N-beta-(aminoethyl)-gamma-aminopropyltrimethoxysilane, aminopropyltrimethoxysilane, trimethoxyvinylsilane, trimethoxymethylsilane or mixtures of two or more thereof, or the methyl- or vinyl-tris(2-butanoneoximino)silanes or, also, products such as Zusatzmittel-TI (Trademark of BAYER). In one embodiment, the water-scavenger further comprises at least one amino-, mercapto- or epoxy-containing alkoxysilane or a siloxane.

Preferably, in the composition of the invention, the water-scavenger comprises at least one alkoxysilane.

The water scavenger may suitably be present in an amount from about 1% to about 10% of the composition subject to there being an effective quantity present, preferably from 2% to 8%. The reaction of the water scavengers, especially the alkoxysilanes, with water is also catalysed by the catalysts identified above.

The silane may also preferably act as and/or contain an adhesion promoter, especially when it is an organosilane compound such as, for example, amino-, mercapto- or epoxy-containing alkoxy, suitably tri-alkoxy, silanes. These compounds, and also the mono-alkoxysilanes and the siloxanes, for example hexamethyldisiloxane, take part in hydrolysis and silanol condensation reactions when moisture from outside becomes available. Using suitable silanes or siloxanes as cross-linkers, adhesion promoters or chain-extenders, excellent adhesion properties and a well-defined cross-linking density may be achieved. Using an optimal mixture of amino- and epoxy-based trialkoxysilanes it is possible to improve also the water resistance of the cured windscreen sealant.

A suitable quantity of adhesion promoter may be from 0.5% to 5% of the composition.

Hence, the composition preferably contains (tri)alkoxysilanes in an amount of from 1 to 10%, preferably 2, to 8%. Preferably the amino- and/or epoxy-silanes represent from 20, to 70% of the total weight of the silanes. The amino-silane to epoxy-silane weight ratio can be from 20:1 to 1:1;, epoxy-silane in excess in the same ratios is also possible.

More preferably, in the composition of the invention, the water-scavenger further comprises at least one amino-, mercapto- or epoxy-containing alkoxysilane or at least one siloxane.

The rheology controller should preferably be capable of giving sufficient thickening for satisfactory application of the uncross-linked composition to inclined or vertical surfaces. The rheology of the composition is judged by reference to the "Storage Modulus" which is measured using a Physical Rheometer MC 100, using an oscillation measurement. The measurement is conducted at a temperature of 20° C. using a plate-plate measuring system with a diameter of 25, mm and a gap of 1, mm. After 100, seconds waiting time the plate is oscillated with 61.5, Hz and an angle of 1.2, mRad. The result is given in kPa or kN/m². Reference can also be made to EP-A-0819749, already incorporated herein by reference.

Preferably, in the composition of the invention, the rheology controller comprises a heat-activatable rheology controller.

The preferred minimum storage modulus for satisfactory application as a motor vehicle adhesive is 200, kN/m², and can be up to about 400, kN/m². For general adhesive or sealant use the storage modulus range could suitably be 150, $kN/m^2$, to about 450, $kN/m^2$. The composition is held in the non-cross-linked state in storage and would in most cases be of insufficient initial viscosity for satisfactory application in the absence of an added rheology controller. It is a preferred feature of the invention that the rheology controller is an effective quantity of an additive which is activatable to the required viscosity by heating although the scope of the invention is not essentially limited to this and other rheological additives known in the art may be used. It is most preferred in the invention that, in the production of the adhesive or sealant compositions, the storage modulus is used as a well-fitting approximation model of the rheology of the composition. Heat-activatable rheological additives include the castor-oil based additives such as, for example, the material available under the Trade Names THIXCIN® and THIXATROL®. They also give effective sag and slump control.

The preferred rheological additives are the family of polyamide waxes such as, for example, the material available under the Trade Name DISPARLON®. These are heat-activatable via a mechanism involving the entanglement of polyamide chains. They give excellent thickening with effective sag and slump control and, additionally, they are less susceptible to seeding or to deterioration as a result of excessive application temperature.

A suitable quantity of the rheology controller may be about 1% to 10%, preferably 1% to 5% of the composition or as required to fulfill its purpose.

A suitable activation temperature for the polyamide waxes is at least 50° C., preferably at least 60° C., most preferably at least 75° C. and up to, for example, 85° C. or 95° C. This may fulfill also the function of encouraging the scavenging of moisture from the composition which is particularly effective when a combination of an alkoxysilane water scavenger and a dibutyltin or dioctyltin type catalyst is used.

More preferably, in the composition of the invention, the rheology controller is a polyamide wax.

Additionally, the composition may comprise additives such as pigments, stabilizers and fillers, as indicated in EP-A 1605008. An example of a suitable filler is calcium carbonate, such as a calcium stearate coated, precipitated $CaCO_3$.

Preferably, the composition of the invention, when stored in a moisture-free container during 3, or 6, weeks at 50° C. after its preparation, has a viscosity measured at 0.1, Hz and 23° C. above 50, kPa·s. Such values improve the green strength of the composition over the values known from the prior art.

Advantageously, the composition of the invention, when stored in a moisture-free container during 3, or 6, weeks at 50° C. after its preparation, has a viscosity measured at 5.0, Hz and 80° C. lower than 3, kPa·s. Such values are suitable in regard of the gunnability of the composition as a warm melt.

The measurements of the viscosities such as defined above, on compositions according to the invention which, after preparation, have been submitted to storage tests in a moisture-free container during 3, or 6, weeks at a temperature of 50° C., are consistent and provide a reliable information on the effective green strength and gunnability of said compositions when stored at room temperature in an appropriate container during up to 12, months.

In a further aspect, the invention relates to a method for direct glazing of a windscreen on a metallic automotive frame, comprising the steps of:
  (i) applying a composition according to the invention on said windscreen and/or frame; and
  (ii) securing said windscreen and said frame together, wherein the composition is warmed to a temperature between 30° C. and 100° C. before it is applied on said windscreen and/or frame.

Preferably, said method does not include a preliminary step of applying a primer on said windscreen, before the application of the composition on said windscreen and/or frame.

In most cases, the ambient temperature itself will not suffice to warm the adhesive to the appropriate temperature for dispensing it. Preferably the composition is—dependent of its exact components—warmed to a temperature from 50° C. to 90° C., most preferably from 70° C. to 85° C., wherein a temperature of approximately 80° C. is most preferred.

The composition may be actively warmed in several known ways, two of which are exemplified.

Firstly, the composition may be present in a small moisture impermeable container or cartridge which is warmed in any conventional way to a temperature appropriate for the specific composition. The small container or cartridge is subsequently inserted in a pistol for dispensing the composition out of the container, so that the composition has the suitable temperature when gunned out of the container.

Secondly, the composition may be stored in a large container or vessel, from which the composition is dispensed by movement of a piston inside the vessel. The piston has a through opening through which the composition is dispensed and further led through a hose. The piston as well as the hose are warmed to appropriate temperatures so that the composition acquires the suitable temperature when dispensed from the end of the hose.

In a further aspect the invention relates to the use of the composition of the invention as a motor vehicle windscreen adhesive, wherein the composition is warmed to a temperature between 30-100° C. before use.

Alternatively, the invention relates to the use of the composition of the invention as an adhesive for the mounting of electrical components or of components connected thereto, wherein the composition is warmed to a temperature between 30-100° C. before use.

Furthermore, the invention relates to the use of the composition of the invention as an adhesive for panels, wherein the composition is warmed to a temperature between 30-100° C. before use.

As set out in the introductory part, in the case that a flat object such as a panel is to be glued to a substrate having a bent surface, the composition of the invention has the advantage of an improved green strength. Therefore, the glued panel is kept in a bent form, similar to the bent form of the substrate—there is no need for the use of clamps to fix the object onto the substrate so as to force it into a bent shape. Furthermore, the composition is advantageous in case a panel is glued to a surface and the assembly is subject to shear forces, e.g. gravitational force when gluing a panel to a vertical surface. Because of the improved green strength, the panel will stick better to the position as intended, thus reducing the need of devices for temporarily fixing the panel on the intended position.

In a last aspect the invention relates to a process for the production of a composition according to the invention, comprising the step of mixing the following components:
  a cross-linkable polymer which has silyl end groups having cross-linking groups, the cross-linkable polymer having a functionality of on average 3-12, cross-linking groups, more preferred 4-10, most preferred 5-8,
  a cross-linking catalyst for the polymer
  a rheology controller;
  a water scavenger a polypropylene having a melting point between 30° C. and 100° C., wherein the resulting mixture of components is brought to such a temperature that the polypropylene material plastically deforms.

In this way, by having the PP plastically deformed, a homogeneous mixing of the PP with the other components is achieved, which is necessary for obtaining an effective composition according to the invention. The temperature needed for plastic deformation is in the range corresponding to the melting point range of the PP, i.e. between 30° C. and 100° C., though it does not necessarily has to be the exact same temperature as the melting point of the used thermoplastic polymer material. The temperature needed for plastic deformation, is also dependent on other characteristics of the mixing process such as the mixing speed, the mixer used, the speed of addition of thermoplastic polymer material, etc.

Advantageously, before admixing, the PP is brought to such a temperature that it is plastically deformed already in advance.

In a preferred embodiment, the mixing is performed by initially combining the cross-linkable polymer with the water scavenger, adding the pigment, the rheology controller, the PP and filler under low speed mixing followed by a high speed mixing under vacuum. During mixing the temperature is brought to about 85-95° C., to ensure a satisfactory homogeneous mixture. Preferably the catalyst is added afterwards under vacuum and mixing. The composition obtained is filled into a water-impermeable container and sealed therein.

The filled container may then again be heated to the required activation temperature for the rheology controller to get the required thixotropic characteristics and may be stored without substantial seeding or deterioration.

Preferably, in the process for the production of a composition according to the invention, the rheology controller is heat-activatable and the composition is heated, preferably after being enclosed in a moisture impermeable container.

One further feature of the invention is that the composition is preferably packed in an impermeable (airtight) container to protect it from ambient moisture, preferably after a balanced heat-treatment as described above to encourage the scavenging or emission of moisture from the composition. One suitable impermeable material for the container is high density polyethylene or polyethylene coated with aluminium foil. The container is suitably in the form of a cartridge or respectively in the form of the sausage suitable for use in conjunction with application equipment.

It is also most preferred that no organic solvent or any VOC need be present. It is preferred that the composition is solvent-free so as to avoid the environmental disadvantages referred to above.

EXAMPLES

Compositions were prepared containing different combinations of the SAX® 725, cross-linkable polymer with a PolyPropylene which is Licocene® PP1302, from Clariant, as outlined in table I below. As a comparative example, a prior art composition containing SAX® 725, without such PolyPropylene was prepared as well.

The prior art composition is formulated as follows (in wt. %):

| SAX ® 725 | 30-60 |
| Polyamide wax | 1-5 |
| Trimethoxysilanes mixture | 2-8 |
| Tin catalyst | 0.2-0.9 |
| Calcium stearate-coated, precipitated, CaCO3 | 25-55 |
| Additives (carbon black, pigments) | 0.5-5 |
| Stabilizers | 0.3-0.6 |

The compositions of the invention containing PolyPropylene are based on the above prior art composition, wherein the SAX® 725, content is reduced to allow for specific contents of Licocene® PP1302.

The compositions were prepared in line with the preferred embodiment described above. All ingredients, except the tin catalyst and the PP, are mixed in a planetary dissolver, and brought to a temperature comprised between 85-95° C. Subsequently, PP is added according to the weight ratios given in table I. The temperature is maintained while mixing during 20-30 minutes. Finally, the mixture is allowed to cool off, while adding tin catalyst under mixing. The obtained mixtures are further analyzed as set out below.

Viscosity of the compositions was measured at two temperatures, each at a specific shear rate. A shear rate of 0.1, Hz is typical for the product in rest, 5, Hz is typical for the product when it is slowly flowing. 80° C. is a typical temperature for the warm melt composition when gunned out of a cartridge; 23° C. resembles the warm melt composition after complete cooling off to room temperature. These viscosity measurements were carried out on compositions which after their preparation have been submitted to storage tests in a moisture-free container during 3 or 6, weeks at a temperature of 50° C. These measurements are believed to provide a reliable information of the effective green strength and gunnability of said compositions when stored at room temperature in an appropriate container during up to 12, months.

In other terms, the viscosity measurement at 0.1, Hz and 23° C. carried out on a sample of the composition packed in a cartridge stored in the above conditions gives a representative indication of the green strength of said composition at the time of its application. Preferably, the viscosity measured in said conditions is therefore above 50, kPa·s.

In a similar way, the viscosity measurement at 5, Hz and 80° C. carried out on a sample of the composition stored in the above conditions gives a representative indication of how well the warm melt composition may flow when gunned out of the cartridge, i.e. the gunnability. Preferably said viscosity should be lower than 3.0, kPa·s, preferably 2.0, kPa·s.

Green strength of the compositions was also assessed by the yield test which is described here-after.

Mechanical strength was measured as stress-strain properties and shear strength, more precisely shear stress at rupture. The measurements serve as a check whether the stress-strain properties and shear strength of the composition of the invention are still acceptable in comparison with the prior art composition containing no PP.

Experimental Procedures

Viscosity (Pa·s) was measured at the indicated temperatures on a rheometer Physica MCR-300, by rotation measurement with gap width of 1, mm.

For the yield test, the composition is heated till 70° C. and an aluminum lap shear test piece is made after ISO 4587, with overlap of 625, mm², and an adhesive layer thickness of 1, mm. Immediately after the lap shear test piece has been closed, the test piece is hung vertically to a support and a device (F) is attached at the lower end of the shear test piece.

Directly after this device is attached, water is added to increase the weight F. As soon as a displacement of the lap shear test piece of more then 1, mm was observed the addition of water was stopped and the weight of the added water is determined. Then the yield in Pa (shear strength) is calculated by dividing the weight of the water by the overlap surface.

Stress-strain properties were measured on samples of a freshly prepared composition, cured in the form of dumbbells probes, wherein "E-module" is the E-modulus between 5, and 10% elongation, and "Force at 100%" is the tensile force at 100% elongation.

Shear Strength was measured after 2, weeks of curing at room temperature and 50% of relative humidity of a freshly prepared composition. Shear Strength measurements were taken on an aluminium substrate with primer. The shear strength was measured as the stress at rupture; the failure mode is indicated as follows: c for cohesive.

Details Concerning the Preparation of the Shear Test Pieces:

Shear test pieces were made, three for each composition to be tested, with an overlap of 25*12.5, mm comprising 2, aluminium substrates and corresponding to an adhesive joint of 2 mm thickness. These test pieces were cured for two weeks at 23° C. and 50% of relative humidity. After curing the test pieces were tested at a tensile speed of 10, mm/min.

TABLE I

| | Test results. | | | | |
|---|---|---|---|---|---|
| Weight % of SAX ® 725 | | 47 | 43 | 40.3 | 37.8 |
| Weight % of PP | | 0 | 5 | 7.5 | 10 |
| Viscosity (kPa · s) | at 23° C. and 0.1 Hz | 43 | 89 | 138 | >140 |
| after 3 weeks at 50° C. | at 80° C. and 5.0 Hz | 0.94 | 1.31 | 1.42 | 1.59 |
| Viscosity (kPa · s) | at 23° C. and 0.1 Hz | 42 | 97 | 150 | >150 |
| after 6 weeks at 50° C. | at 80° C. and 5.0 Hz | 0.95 | 1.41 | 1.42 | 1.42 |
| Yield test | Shear strength (Pa) | 1490 | 1756 | 3136 | 3732 |
| Stress-strain | E-module (MPa) | 5.98 | 7.86 | 6.44 | 6.82 |
| properties | Force at 100% (MPa) | 2.51 | 2.53 | 2.16 | 2.13 |
| Shear Strength | Shear stress at rupture (MPa) | 3.07 | 2.80 | 2.10 | 1.81 |
| | Failure mode | 100% c | 100% c | 100% c | 100% c |

From the results shown in Table 1, the following conclusions are relevant for the compositions of the invention, when compared to the prior art composition of EP1605008:
- they show a better green strength, in particular as expressed in viscosity at 0.1, Hz and 23° C.;
- they show a sufficient gunnability, as expressed in viscosity at 5.0, Hz and 80° C.;
- they show acceptable stress-strain properties;
- they show some loss of shear strength, however still within limits that are acceptable for its use as an adhesive or sealant composition.

The invention claimed is:

1. Adhesive composition comprising:
   a content of greater than 0 and less than 15% by weight of a PolyPropylene having a melting point between 30° C. and 100° C.;
   from 30 to 60% by weight of a cross-linkable polymer with silyl end groups comprising cross-linking groups bonded to the silicon atom, the cross-linkable polymer having a functionality of on average 3-12 cross-linking groups;
   a cross-linking catalyst for the cross-linkable polymer;
   a water scavenger; and
   a rheology controller.

2. The adhesive composition according to claim 1, wherein the content of PP is from 2 to 10% by weight.

3. The adhesive composition according to claim 1, wherein the silyl end group of the cross-linkable polymer has the following formula:

$$-Si(R^2)_{3-a}X_a$$

wherein:
$R^2$ represents an alkyl group containing 1 to 20 carbon atoms, an aryl group containing 6 to 20 carbon atoms, an aralkyl group containing 7 to 20 carbon atoms or a triorganosiloxy group of the formula $(R')_3SiO$—, in which the three R' groups are the same or different and each is a monovalent hydrocarbon group containing 1 to 20 carbon atoms, and when there are two or more $R^2$ groups, they may be the same or different;
X represents a hydroxyl group or a hydrolysable group and, when there are two or more X groups, they may be the same or different;
a represents 0, 1, 2 or 3.

4. The adhesive composition according to claim 1, wherein the silyl end group of the cross-linkable polymer has the following formula:

$$-[Si(R^1{}_{2-b})(X_b)O]_m Si(R^2)_{3-a}X_a$$

wherein :
$R^1$ and $R^2$ are the same or different and each represents an alkyl group containing 1 to 20 carbon atoms, an aryl group containing 6 to 20 carbon atoms, an aralkyl group containing 7 to 20 carbon atoms or a triorganosiloxy group of the formula $(R')_3SiO$—, in which the three R' groups are the same or different and each is a monovalent hydrocarbon group containing 1 to 20 carbon atoms, and when there are two or more $R^1$ or $R^2$ groups, they may be the same or different;
X represents a hydroxyl group or a hydrolysable group and, when there are two or more X groups, they may be the same or different;
a represents 0, 1, 2 or 3;
b represents 0, 1, or 2 and the value of b in two or more recurring units may be the same or different;
m represents an integer of 0 to 19;
with the condition that the relation a +Σb≥1 is satisfied.

5. The adhesive composition according to claim 4, wherein the silyl end group of the cross-linkable polymer has the following formula:

$$-A-(CH_2)_n-CHR^3-CH_2-[Si(R^1{}_{2-b})(X_b)O]_m Si(R^2)_{3-a}X_a$$

where:
n is zero or 1;
$R^3$ is a saturated or unsaturated alkyl group having 1-4 C atoms, a hydroxyl group, or a thiol group; and wherein the saturated or unsaturated alkyl group is optionally substituted by a hydroxyl or thiol group; and A is an oxo, thio, carbamate or ureido linkage.

6. The adhesive composition according to claim 1, wherein the cross-linkable polymer comprises a polyether polymer, a polyether-urethane polymer, a polyester polymer, a polyester-polyurethane polymer or mixtures thereof.

7. The adhesive composition according to claim 1, wherein the cross-linkable polymer is a polyoxypropylene polymer having a silyl group at each end of its chain.

8. The adhesive composition according to claim 1, wherein the water scavenger is an alkoxysilane present in an amount from about 1% to about 10% by weight.

9. The adhesive composition according to claim 1, wherein the rheology controller is a polyamide wax present in a quantity of 1% to 5% by weight.

10. The adhesive composition according to claim 1, wherein the content of PP is from 4 to 8% by weight.

11. A method for direct glazing of a windscreen on a metallic automotive frame, comprising:
(i) applying the composition defined in claim 1 on the windscreen and/or frame; and
(ii) securing the windscreen and the frame together,
wherein the composition is warmed to a temperature between 30° C. and 100° C. before it is applied on the windscreen and/or frame.

12. The method according to claim 11 wherein the composition is warmed to a temperature from 50° C. to 90° C.

* * * * *